United States Patent
Kaiser et al.

(10) Patent No.: US 12,365,303 B2
(45) Date of Patent: Jul. 22, 2025

(54) RESTRAINING DEVICE AND AIRBAG MODULE

(71) Applicant: ZF AIRBAG GERMANY GMBH, Aschau a. Inn (DE)

(72) Inventors: Rupert Kaiser, Griesstatt (DE); Koller Desiree, Lohkirchen (DE)

(73) Assignee: ZF AIRBAG GERMANY GMBH, Aschau A. Inn (DE)

( * ) Notice: Subject to any disclaimer, the term of this patent is extended or adjusted under 35 U.S.C. 154(b) by 0 days.

(21) Appl. No.: 18/558,546

(22) PCT Filed: Mar. 8, 2022

(86) PCT No.: PCT/EP2022/055816
§ 371 (c)(1),
(2) Date: Nov. 2, 2023

(87) PCT Pub. No.: WO2022/233477
PCT Pub. Date: Nov. 10, 2022

(65) Prior Publication Data
US 2024/0239296 A1    Jul. 18, 2024

(30) Foreign Application Priority Data
May 4, 2021 (DE) ............ 10 2021 111 513.2

(51) Int. Cl.
*B60R 21/2338* (2011.01)
*B60R 21/264* (2006.01)

(52) U.S. Cl.
CPC ........ *B60R 21/2338* (2013.01); *B60R 21/264* (2013.01); *B60R 2021/23388* (2013.01)

(58) Field of Classification Search
CPC ........................................... B60R 2021/23388
See application file for complete search history.

(56) References Cited

U.S. PATENT DOCUMENTS 8,517,419 B2 * 8/2013 Debler ............... B60R 21/2338
                                                  280/736
9,102,302 B2 * 8/2015 Muller .................... F42B 3/006
(Continued)

FOREIGN PATENT DOCUMENTS

DE    102005058721 A1 *  6/2007    .......... B60R 21/233
DE    102012007406 A1    10/2013
(Continued)

OTHER PUBLICATIONS

PCT International Search Report for corresponding International Application Serial No. PCT/EP2022/055816, mailed Jun. 22, 2022, pp. 1-4.

*Primary Examiner* — Nicole T Verley
(74) *Attorney, Agent, or Firm* — Tarolli, Sundheim, Covell & Tummino LLP

(57) ABSTRACT

The invention describes a holding device (12) for holding and releasing a tensioning means (14) of a vehicle safety system, e.g., an airbag tether. The holding device (12) includes a pyrotechnical actuator assembly (24) for holding and, in terms of signals, specifically releasing the tensioning means (14), wherein the actuator assembly (24) comprises a plastic base (26) in which a pyrotechnical unit (28) including a propelling charge and an igniter (30) is accommodated, wherein the pyrotechnical unit (28) has a rear side (36) and a front side (38). The holding device (12) has a tensioning means holder (40) which is directly adjacent at least to the front side (38) of the pyrotechnical unit (28), covers the same and is detachably supported on the plastic base (26) so that the tensioning means holder (40) detaches as a unit completely from the plastic base (26). The plastic material forming the plastic base (26) is injection-molded around the tensioning means holder (40) in the area of its longitudinal end associated with the pyrotechnical unit (28), and an area which is not injection-molded constitutes a holding portion (Continued)

(48) for the tensioning means (14). In addition, an airbag module (10) comprising a holding device (12) is described.

16 Claims, 6 Drawing Sheets

(56) References Cited

U.S. PATENT DOCUMENTS

| | | | |
|---|---|---|---|
| 11,180,107 B2 * | 11/2021 | Peremarty | B60R 21/017 |
| 2009/0167006 A1 | 7/2009 | Schoenhuber et al. | |
| 2010/0187797 A1 * | 7/2010 | Debler | B60R 21/2338 |
| | | | 89/1.14 |
| 2012/0242070 A1 | 9/2012 | Paxton et al. | |
| 2021/0061215 A1 * | 3/2021 | Debler | B60R 21/2338 |

FOREIGN PATENT DOCUMENTS

| | | | | |
|---|---|---|---|---|
| DE | 102012023877 A1 * | 6/2014 | | B60R 21/2338 |
| DE | 102015004000 A1 * | 10/2016 | | |
| DE | 102018101155 A1 | 7/2019 | | |
| EP | 4238836 A1 * | 9/2023 | | B60R 21/2338 |
| WO | WO-2007065715 A1 * | 6/2007 | | B60R 21/233 |
| WO | WO-2014106567 A1 * | 7/2014 | | B60R 21/2338 |

* cited by examiner

RESTRAINING DEVICE AND AIRBAG MODULE

RELATED APPLICATIONS

This application is a U.S. National Stage Application filed under 35 USC 371 claiming priority to Serial No. PCT/EP2022/055816, filed on 8 Mar. 2022; which claims priority from German Patent Application DE 10 2021 111 513.2, filed 4 May 2021, the entireties of which are hereby incorporated herein by reference.

TECHNICAL FIELD

The invention relates to a holding device for holding and releasing a tensioning means of a vehicle safety system, specifically a tether of an airbag of a vehicle safety system, as well as to an airbag module comprising a holding device.

BACKGROUND

Airbags are constituents of vehicle safety systems. Frequently, a tensioning means is fastened to an airbag. The tensioning means can help control the deployment of the airbag by releasing the tensioning means, for example, after the airbag has been filled at least partly with a gas. In this way, a desired deployment behavior of the airbag can be achieved.

In addition, the tensioning means can prevent the airbag in the inflated state from deploying excessively in a particular direction. This function is applied, for example, to adaptive airbag concepts or to an active airbag venting. In piloted driving which gains in increasingly more importance, a vehicle occupant can take different positions such as a sitting position, when he/she is driving him-/herself, or a reclined position, when the vehicle is driving on autopilot. When the vehicle occupant is in a reclined position, the airbag must deploy, in the case of need, significantly farther toward the vehicle occupant than when the vehicle occupant is in a sitting position and, thus, is closer to the steering wheel. Hence, when the vehicle occupant is in a sitting position, the tensioning means restricts how far the airbag deploys toward the driver. Since the airbag has the tendency to deploy completely, high forces act on the tensioning means.

SUMMARY

Consequently, it is an object of the present invention to state a holding device for a tensioning means which can absorb high forces and still reliably releases the tensioning means in the case of need.

This object is achieved, according to the invention, by a holding device for holding and releasing a tensioning means of a vehicle safety system, specifically a tether of an airbag of a vehicle safety system, comprising a pyrotechnical actuator assembly for holding and, in terms of signals, specifically releasing the tensioning means, the actuator assembly comprising a plastic base in which a pyrotechnical unit including a propelling charge and an igniter is received and held, the pyrotechnical unit having a rear side and an opposite front side. The holding device further has a tensioning means holder which is directly adjacent to at least the front side of the pyrotechnical unit and covers the same and which is detachably supported on the plastic base in such a way that the tensioning means holder as a unit detaches completely from the plastic base by triggering the igniter. The plastic material forming the plastic base is injection-molded around the tensioning means holder in the area of its longitudinal end associated with the pyrotechnical unit, and an area which is not injection-molded is a holding portion for the tensioning means.

By the plastic material forming the plastic base being injection-molded around the tensioning means holder, the advantage is achieved that the tensioning means holder need not be inserted in the plastic base and, thus, the material is not prestressed.

In addition, as compared to an actuator assembly having an inserted tensioning means holder, no pressure chamber or only a very small pressure chamber is required between the tensioning means holder and the plastic base. In this way, the tensioning means holder can be configured to be particularly massive in the area of the holding portion, thereby attaining high stability of the tensioning means holder. In particular, the tensioning means holder thus can absorb specifically high transverse forces, such as transverse forces greater than 2.5 kN, in particular greater than 5 kN.

The tensioning means holder can be detached particularly non-destructively from the plastic base. More precisely, when triggering the igniter, the tensioning means holder detaches completely from the plastic base, i.e., no remainder is left in the plastic base, in contrast to a tensioning means holder which breaks at a predetermined breaking point. Thus, no sharp break-off edges are formed on which the tensioning means might get caught.

The tensioning means holder can further comprise a relief opening. The relief opening is preferably introduced centrically in the tensioning means holder. The relief opening extends preferably from the end face of the tensioning means holder facing the pyrotechnical unit and, hence, toward the end face of the tensioning means holder remote from the pyrotechnical unit. The relief opening can be a bore, for example, or can be introduced directly into the tensioning means holder, for example during manufacture in an injection-molding process. The maximum size and/or the maximum diameter of the relief opening may depend particularly on the pyrotechnical unit employed.

The relief opening can help discharge excessive energy of the pyrotechnical unit during triggering specifically from the pressure chamber between the tensioning means holder and the pyrotechnical unit and, respectively, from the area in which the tensioning means holder is adjacent to the front face of the pyrotechnical unit. This can be utilized if the ignition force/energy of the pyrotechnical unit is too high, for example. The ignition force or energy in this case is the force/energy which is applied to the tensioning means holder during ignition of the propellant contained in the ignition head of the pyrotechnical unit and the propelling gas generated in this way. The variably configurable relief opening can help control the energy introduced to the movement of the cap as needed.

Accordingly, it can be ensured, for example, that the tensioning means holder can be caught in an airbag module or an airbag module case in a controllable manner even if the ignition force/energy of the pyrotechnical unit is actually too high for the holding device, and the tensioning means holder is prevented from exiting in an uncontrolled manner. Thus, standardized pyrotechnical units can be relied on.

The plastic forming the plastic base is preferably also injection-molded around the pyrotechnical unit. Therefore, the pyrotechnical unit is also held reliably on the plastic base.

For example, the pyrotechnical unit is injection-molded such that it cannot be detached from the plastic base in a non-destructive manner.

The injection-molding around the tensioning means holder and the pyrotechnical unit is specifically performed in one process step. Thus, manufacture of the holding device is particularly efficient.

The tensioning means holder can be made of metal or plastic material and can be partially injection-molded on the outside. Metal is adapted to absorb particularly high transverse forces. For example, the tensioning means holder in this case is a die casting part. A tensioning means holder made of plastic offers the advantage that it is more lightweight and can be manufactured more cost-efficiently.

According to one embodiment, the tensioning means holder includes at its portion received in the plastic base a radially outward projection or a radially inward recess when viewed in the longitudinal direction of the holding device.

Thus, when viewed in the longitudinal direction of the holding device, an undercut is produced, causing a higher holding force to act upon the tensioning means holder.

The axial force necessary for detaching the tensioning means holder from the plastic base can be defined by appropriately designing the undercut, specifically the height of the projection and the depth of the recess.

The projection and, resp., the recess is preferably peripheral. In this way, the tensioning means holder is held particularly reliably in the plastic base when the igniter is not triggered.

By the fact that the plastic material forming the plastic base is injection-molded around the tensioning means holder including the radially outward projection or projections, the advantage is achieved that the undercut can be freely designed and when designing the undercut and the projection or projections it is not necessary to pay attention to the fact that the tensioning means holder can be inserted into the plastic base.

The tensioning means holder preferably has a fastening portion which is accommodated in the plastic base and the adjacent holding portion, wherein a contact face for the tensioning means is provided on the holding portion, particularly wherein the holding portion and the fastening portion together form a cylindrical surface on the outside. Due to the cylindrical surface, the loop can slip off the cylinder after ignition.

According to one embodiment, a laterally projecting collar which is widened compared to the holding portion is connected to one end of the holding portion facing away from the fastening portion. Due to the collar, the tensioning means cannot slip off the tensioning means holder as long as the igniter has not been triggered and the tensioning means holder is supported on the plastic base.

For example, the pyrotechnical unit excluding its electric wires is completely contacted by the holding base and the tensioning means holder. Thus, there is no propellant chamber outside an ignition head of the igniter. The holding device is thus particularly compact.

Preferably, on its end face facing the pyrotechnical unit, the tensioning means holder includes a recess complementary to the pyrotechnical unit in which a portion of an ignition head of the pyrotechnical unit is accommodated. This also contributes to a compact design of the holding device.

According to one embodiment, the tensioning means holder is partially injection-molded in the plastic base and the plastic base is configured so that, when the pyrotechnical unit is activated, the plastic base remains free of cracks. In this way, parts of the plastic base are prevented from breaking off and ending up in the constructed space environment in an uncontrolled manner.

As an alternative, the tensioning means holder is partially injection-molded in the plastic base and the plastic base is configured so that the cracks formed by the plastic base, when the pyrotechnical unit is activated, are so weak that no parts of the plastic base are allowed to break off. In this way, parts of the plastic base can also be prevented from breaking off and ending up in the constructed space environment in an uncontrolled manner.

The object is further achieved, according to the invention, by an airbag module for a vehicle safety system comprising an airbag and a holding device which is configured as above described, and comprising a tensioning means which is fastened to an airbag and is held on the holding device. This allows the tensioning means to delimit deployment of the airbag as long as it is held on the holding device.

In order to retain the tensioning means as simply as possible on the holding device, a loop is formed at one end portion of the tensioning means which is not fastened to the airbag, wherein the loop is laid, in the non-released state of the holding device, around the tensioning means holder, specifically around the holding portion of the tensioning means holder.

BRIEF DESCRIPTION OF THE DRAWINGS

Further advantages and features of the invention will be evident from the following description and from the drawings which are referred to, and wherein.

DESCRIPTION

Figure 1:
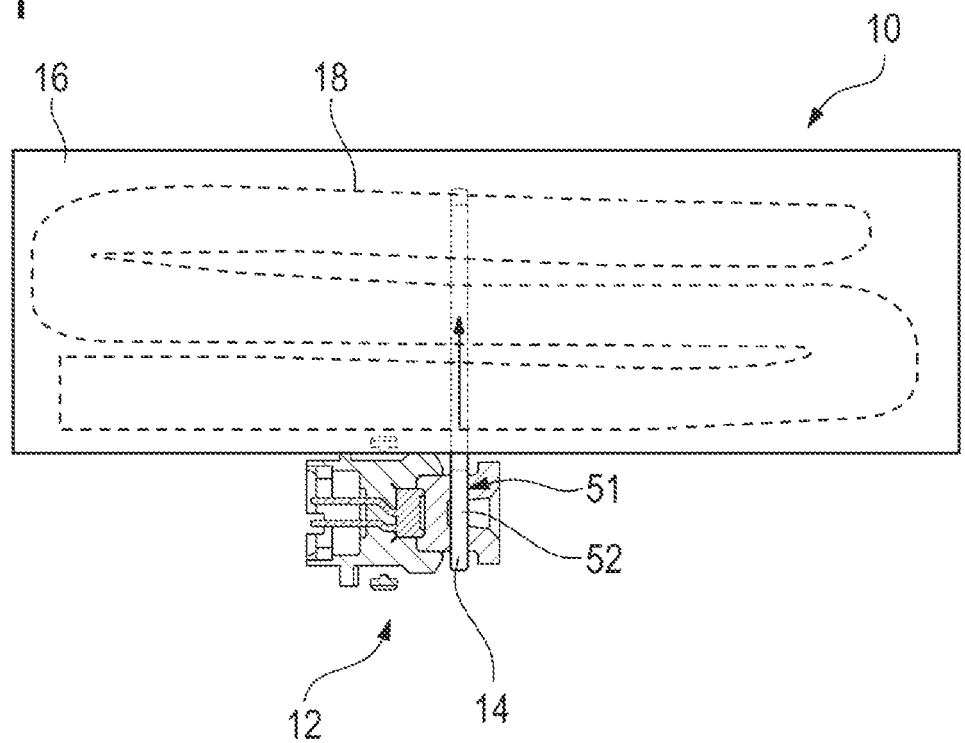
FIG. 1 shows an airbag module according to the invention comprising a holding device according to the invention in a non-triggered state.

FIG. 1 illustrates an airbag module 10 comprising a holding device 12 for holding and releasing a tensioning means 14 of a vehicle safety system, specifically a tether.

In addition to the holding device 12, the airbag module 10 comprises an airbag case 16 and an airbag 18, the airbag 18 being accommodated folded in the airbag case 16 in the non-triggered state of the airbag module 10.

The tensioning means 14 is fastened to the airbag 18 and is held on the holding device 12 when the holding device 12 is in a non-triggered state, as illustrated in FIG. 1. In this way, the tensioning means 14 can restrict unfolding of the airbag 18.

Figure 2:
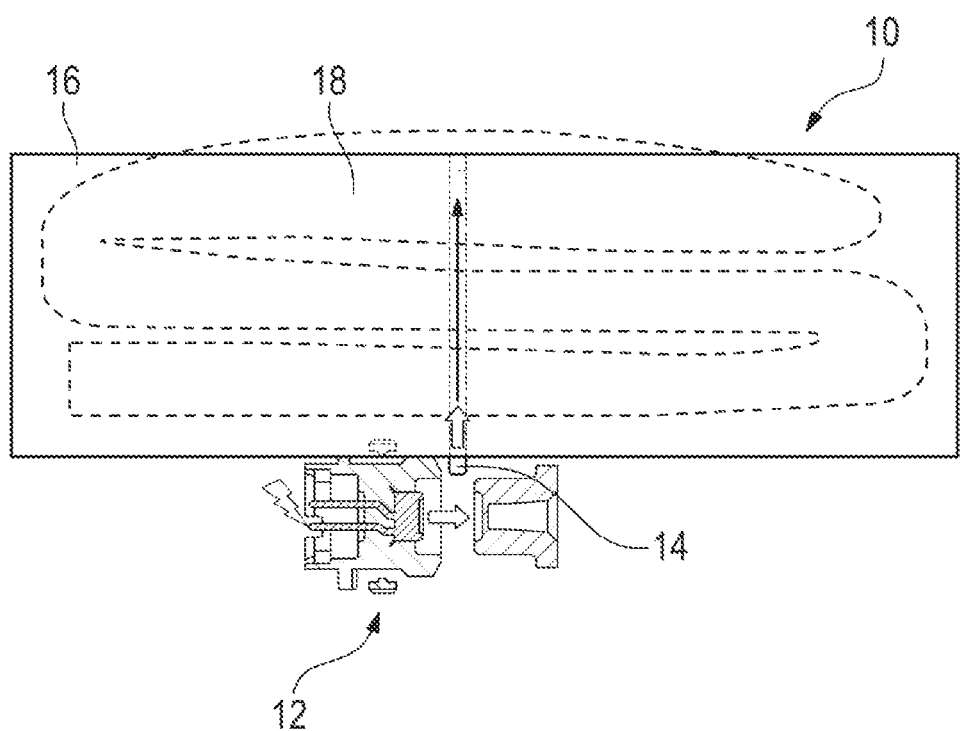
FIG. 2 shows the airbag module of FIG. 1, with the holding device being triggered.

FIG. 2 illustrates the airbag module 10 in a state in which the holding device 12 is triggered and, thus, the tensioning means 14 is released. In this case, the airbag 18 can freely deploy.

Figure 3:
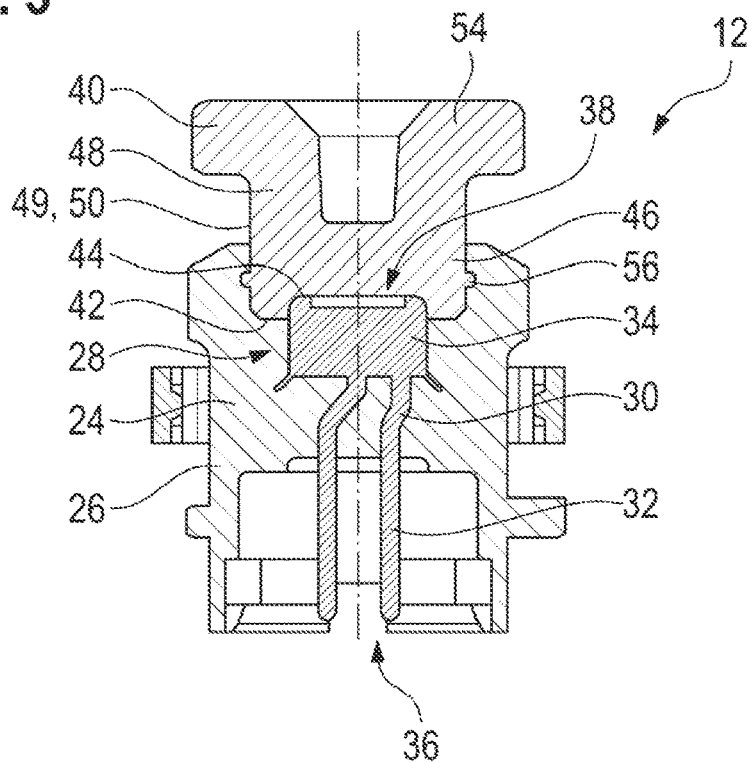
FIG. 3 shows the holding device of the airbag module illustrated in FIGS. 1 and 2.

FIG. 3 illustrates the holding device 12 of FIGS. 1 and 2 in a detail view in the non-triggered state.

The holding device 12 comprises a pyrotechnical actuator assembly 24 for holding and, in terms of signals, specifically releasing the tensioning means 14.

The actuator assembly 24 comprises a plastic base 26 and a pyrotechnical unit 28 including an igniter 30. The igniter 30 has electric wires 32 and an ignition head 34. In the ignition head 34, a propelling charge is contained so that a propellant is generated by triggering the igniter 30.

The pyrotechnical unit 28 is received and held in the plastic base 26. In particular, the plastic material forming the plastic base 26 is injection-molded at least partially around the pyrotechnical unit 28.

The pyrotechnical unit 28 has a rear side 36 and an opposite front side 38. The igniter may be electrically contacted on its rear side 36.

Further, the actuator assembly 24 includes a tensioning means holder 40 which is directly adjacent at least to the front side 38 of the pyrotechnical unit 28 and covers the same. More precisely, the tensioning means holder 40 is adjacent to the ignition head 34, i.e., in an area where the plastic material forming the plastic base 26 is not injection-molded around the ignition head 34.

The tensioning means holder 40 specifically constitutes a cap.

In the shown embodiment, the tensioning means holder 40 includes, on its end face 42 facing the pyrotechnical unit 28, a recess 44 complementary to the pyrotechnical unit 28 in which a portion of the ignition head 34 of the pyrotechnical unit 28 is received.

Thus, the pyrotechnical unit 28 excluding its electric wires 32 is contacted and, resp., enclosed completely by the plastic base 26 and the tensioning means holder 40.

In a further embodiment (not shown), the tensioning means holder 40 does not include any recess on its end face 42 facing the pyrotechnical unit 28. In such embodiment, the end face 42 facing the pyrotechnical unit 28 can form a continuous and specifically planar surface. The front side 38 of the pyrotechnical unit 28 can be adjacent at least partially to the end face 42 of the tensioning means holder 40. In this embodiment, too, the pyrotechnical unit 28 excluding its electric wires 32 is completely enclosed by the plastic base 26 and the tensioning means holder 40.

Further, the tensioning means holder 40 can be made of plastic material or of metal. The tensioning means holder 40 illustrated in FIGS. 1 to 3 is specifically a tensioning means holder 40 made of plastic material.

In order to enable the tensioning means 14 to be released, the tensioning means holder 40 is detachably supported on the plastic base 26 in such a way that, by triggering the igniter 30, it detaches as a unit completely from the plastic base 26.

More precisely, the tensioning means holder 40 is supported on the plastic base 26 by the plastic material forming the plastic base 26 being injection-molded around the tensioning means holder 40, specifically being injection-molded partially on the outside, in the area of its longitudinal end associated with the pyrotechnical unit 28.

By the injection-molding, the tensioning means holder 40 is held frictionally and/or non-positively in the plastic base 26.

In particular, the tensioning means holder 40 is partially injection-molded in the plastic base 26 and the plastic base 26 is configured so that the plastic base 26 remains free of cracks when the pyrotechnical means 28 is activated.

The portion of the tensioning means holder 40 which is accommodated in the plastic base 26 forms a fastening portion 46.

An area of the tensioning means holder 40 which is not surrounded by injection-molding is a holding portion 48 for the tensioning means 14. A contact face 49 for the tensioning means 14 is provided on the holding portion 48.

The holding portion 48 is directly connected to the fastening portion 46.

The holding portion 48 and the fastening portion 46 together form a cylindrical surface 50 on the outside. Thus, when the holding device 12 is triggered, the tensioning means 14 can easily slip off the tensioning means holder 40.

In order to retain the tensioning means 14 on the holding device 12, a loop 52 is formed at one end portion 51 of the tensioning means 14 which is not fastened to the airbag 18 (see FIG. 1). As a matter of course, the tensioning means may comprise, instead of the loop 52, other elements which enable the tensioning means 14 to be retained on the holding device 12.

In the non-triggered state of the holding device 12, the loop 52 is laid around the tensioning means holder 40, as illustrated in FIG. 1, specifically around the holding portion 48 of the tensioning means holder 40.

In order to prevent the tensioning means 14 from slipping off the holding portion 48 when the holding device 12 is not triggered, a laterally projecting collar 54 which is widened compared the holding portion 48 is connected to an end of the holding portion 48 facing away from the fastening portion 46.

For increasing a retaining force acting on the tensioning means holder 40, the tensioning means holder 40 can include a radially outward projection 56 when viewed in the longitudinal direction of the holding device 12 at its portion accommodated in the plastic base 26, i.e., in the fastening portion 46. In this way, the tensioning means holder 40 is held not only frictionally but also positively in the plastic base 26.

The projection 56 is configured to be peripheral in the shown embodiment.

As an alternative, the tensioning means holder 40 may include an inwardly protruding recess 57 as shown in the embodiment of FIG. 3, for example. The recess 57 can equally be peripheral.

As a matter of course, those skilled in the art are completely free in designing the projection 56 or else several projections 56 and/or one or more radially inwardly protruding recesses and/or the combination of one or more projections 56 with one or more recesses, as the plastic material forming the plastic base 26 is injection-molded around the tensioning means holder 40.

Figure 4:
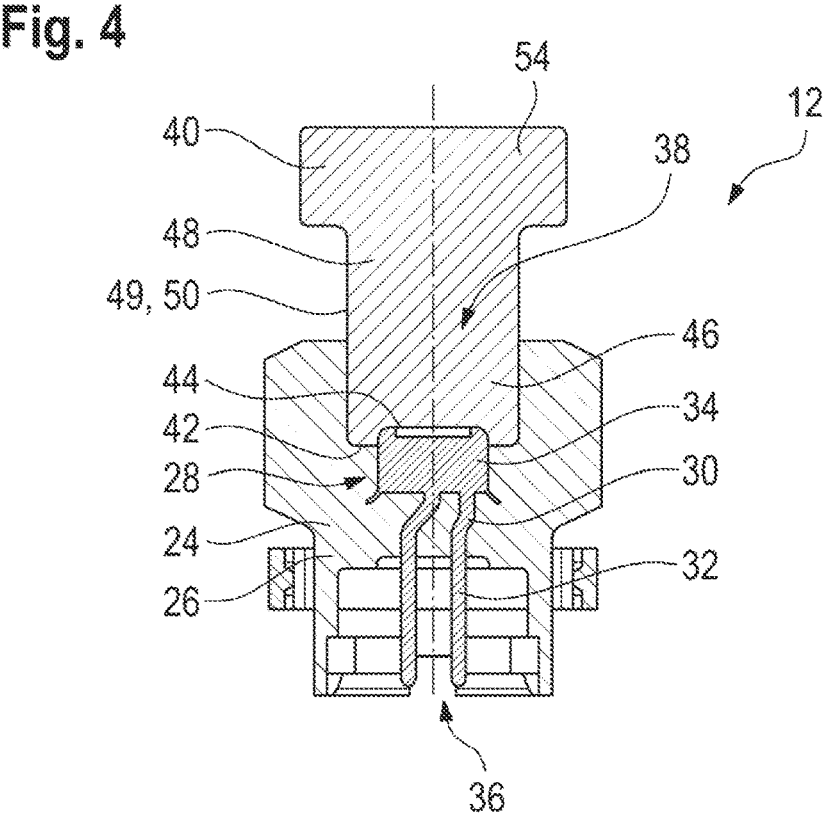
FIG. 4 shows another embodiment of a holding device according to the invention.

FIG. 4 illustrates a holding device 12 according to another embodiment.

Said holding device 12 differs from the holding device illustrated in FIGS. 1 to 3 by the shape of the tensioning means holder 40.

In particular, the tensioning means holder 40 illustrated in FIG. 4 is made of metal. The tensioning means holder 40 is a pressure die casting, for example.

The holding device 12 according to FIG. 4 can also be used in the airbag module 10 shown in FIGS. 1 and 2.

Figure 5:
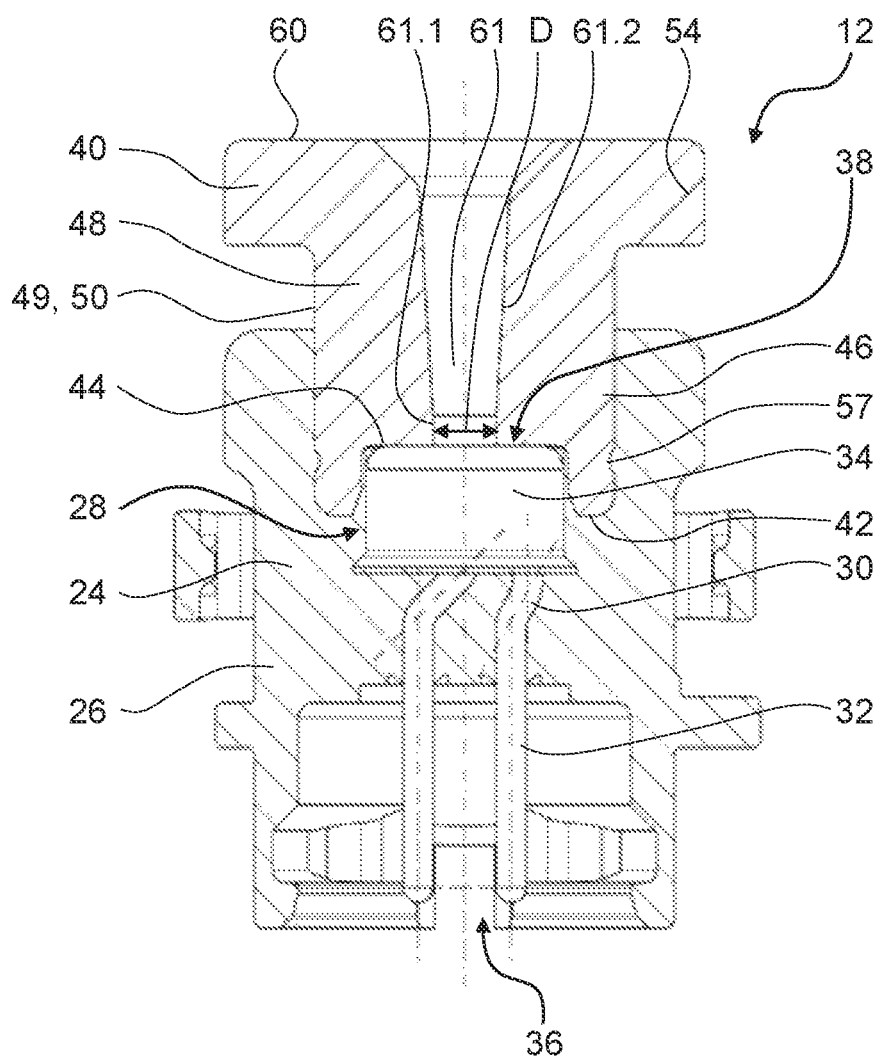
FIG. 5 shows a third embodiment of a holding device according to the invention.

FIG. 5 illustrates a holding device 12 according to a third embodiment.

Said holding device differs from the holding device illustrated in FIGS. 1 to 3 by the shape of the tensioning means holder 40.

In order to increase a retaining force acting on the tensioning means holder 40, the tensioning means holder 40 includes a radially inwardly protruding recess 57 at its portion accommodated in the plastic base 26, i.e., in the fastening portion 46. The recess 57 is configured to be peripheral in the illustrated embodiment.

Furthermore, the tensioning means holder 40 illustrated in FIG. 5 has a relief opening 61. The relief opening 61 extends from the end face 42 facing the pyrotechnical unit 28 and, thus, in the embodiment according to FIG. 5 from the recess 44 of the tensioning means holder 40 complementary to the pyrotechnical unit 28 toward the end face 60 of the tensioning means holder 40 remote from the pyrotechnical unit 28.

The relief opening 61 in the shown embodiment has a bore with parallel lateral edges in the beginning of the relief opening 61.1 and a bore with conical side edges in the end of the relief opening 61.2. Of course, the relief opening 61 may also have other geometries, in particular a bore with continuously parallel or continuously conical side edges. Preferably, the relief opening 61 can be introduced into the tensioning means holder 40 already during manufacture thereof. Also, it is conceivable to introduce the relief opening 61 later into the tensioning means holder 40.

Here, the maximum size and/or the maximum diameter D of the relief opening 61 is adjusted to an ignition force/energy of the pyrotechnical means 28 in the beginning of the relief opening 61.1 which is disposed in the area directly adjacent to the end face 42 facing the pyrotechnical unit 28.

The relief opening 61 can help reduce specifically excess energy of the pyrotechnical unit 28 during triggering, for example if there is provided too high ignition force/energy of the pyrotechnical unit 28. Thus, it can be ensured, for example, that the tensioning means holder 40 can be caught in an airbag module 10 and, resp., an airbag module case in a controllable manner, even if the ignition force/energy of the pyrotechnical unit 28 is actually too high for the holding device 12.

The holding device 12 according to FIG. 5 can also be used in the airbag modules 10 shown in FIGS. 1 and 2 or in FIGS. 6 to 11. In the embodiments of the FIGS. 6 to 11, the relief opening 61, specifically the end of the relief opening 61.2, can constitute the recess 62 for receiving the reinforcing element 58.

Hereinafter, with reference to the FIGS. 1 and 2, triggering of the airbag module 10 and of the holding device 12 will be described.

When the airbag module 10 is triggered, the airbag 18 is inflated.

As long as the holding device 12 is not triggered, the airbag 18 can deploy only to a limited extent, however, as the tensioning means 14 prevents the airbag 18 from completely deploying. As a matter of course, the tensioning means 14 may also be connected, in other embodiments (not shown), to a valve that allows discharge of gas from the airbag 18 after release of the tensioning means 14, for example.

It depends on a sitting position of a vehicle occupant whether the holding device 12 is triggered and, consequently, the tensioning means 14 is released.

If a vehicle occupant is sitting further distant from an instrument panel or if the vehicle occupant is in a reclined position, a higher airbag volume is required than in a sitting position close to the instrument panel.

If a larger airbag volume is required, the tensioning means 14 is released. This is performed by igniting the pyrotechnical unit 28 as illustrated in FIG. 2.

By the ignition, a propelling gas is generated by means of the propellant contained in the ignition head 34, thereby force being applied to the tensioning means holder 40 and the latter being detached from the plastic base 26.

In particular, the tensioning means holder 40 is completely detached from the plastic base 26 so that no remainder of the tensioning means holder 40 is left on the plastic base 26. The plastic base 26 remains free of cracks.

Hence, the tensioning means 14 may slip off the tensioning means holder 40 and is no longer retained by the holding device 12.

The airbag 18 can thus deploy unhindered.

Figure 6:
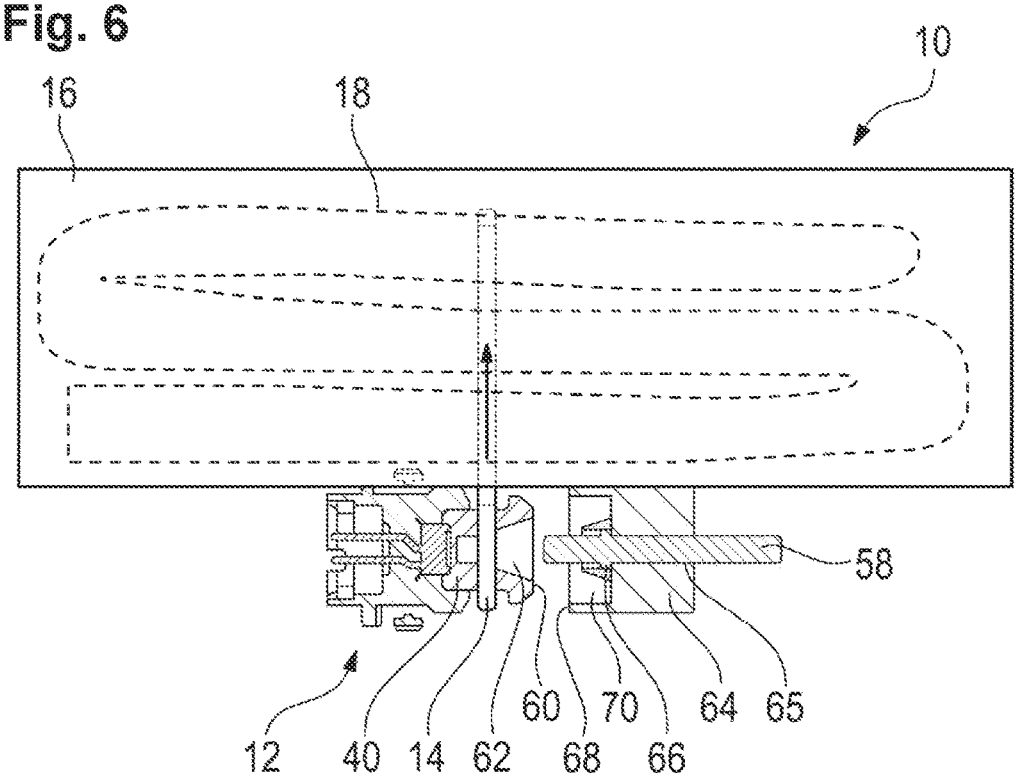
FIG. 6 shows another airbag module according to the invention comprising a holding device according to the invention.
Figure 7:
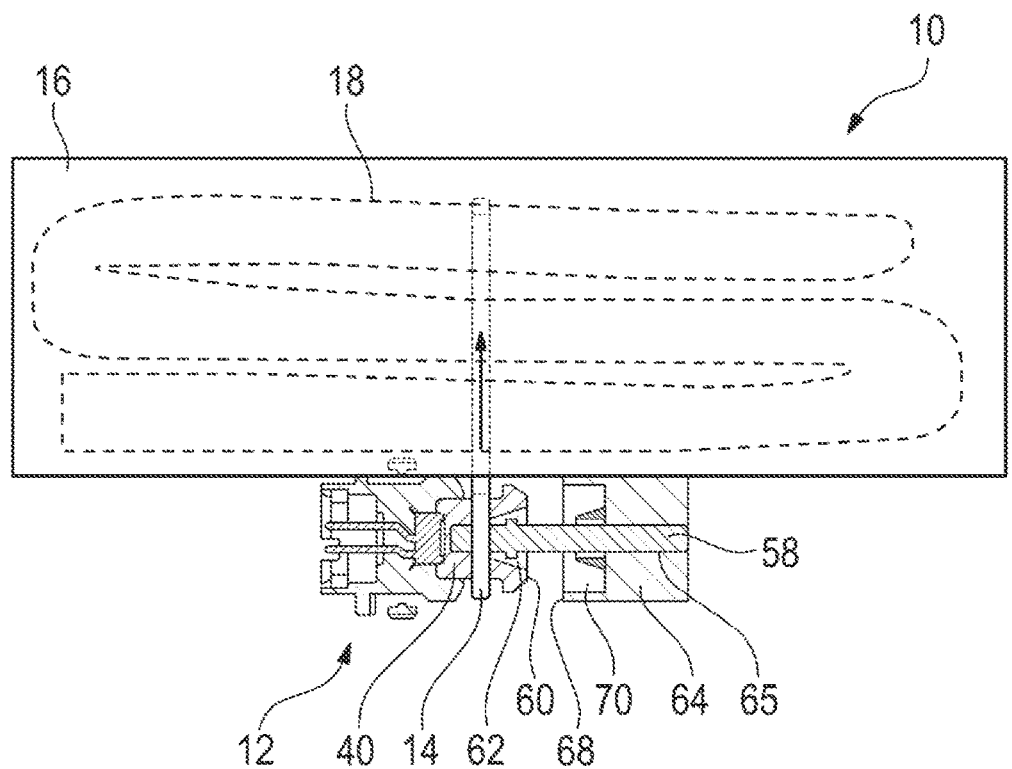
FIG. 7 shows the airbag module of FIG. 5, with the holding device being reinforced.
Figure 8:
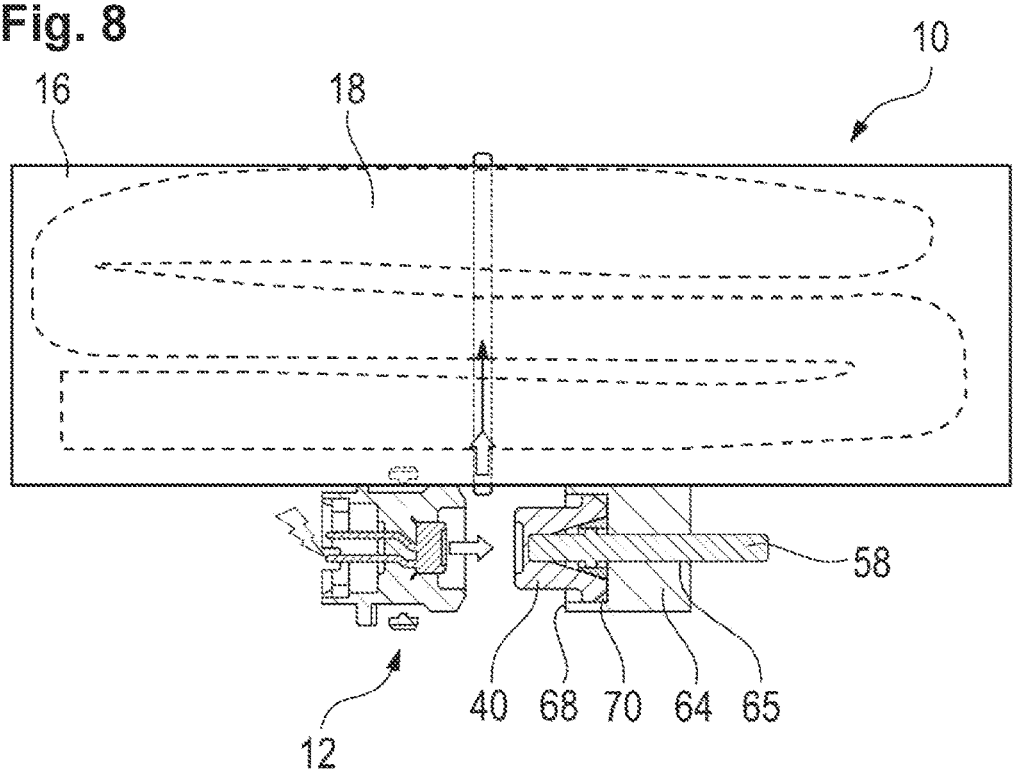
FIG. 8 shows the airbag module of FIGS. 5 and 6, with the holding device being in a triggered state.

The FIGS. 6 to 8 illustrate an airbag module 10 according to a further embodiment.

The airbag module 10 according to FIGS. 6 to 8 differs from the airbag module 10 according to FIGS. 1 and 2 in that the holding device 12 can be reinforced.

The holding device 12 particularly comprises a reinforcing element 58 which serves to increase the stability of the tensioning means holder 40.

For this purpose, the reinforcing element 58 is supported to be axially movable between a first position shown in FIG. 7 and a second position shown in FIG. 8. More precisely, the reinforcing element 58 is movable along a longitudinal axis of the holding device 12.

In the second position, the reinforcing element 58 is disengaged from the tensioning means holder 40 and, in a first position, the reinforcing element 58 is at least partially received, as shown in FIG. 7, in the tensioning means holder 40 and reinforces the latter mechanically. In the reinforced state, the holding device 12 can absorb transverse forces of more than 2.5 kN, specifically more than 5 kN, for example.

For receiving the reinforcing element 58, the tensioning means holder 40 includes a recess 62 at an end face 60 facing away from the plastic base 26 in which the reinforcing element 58 is at least partially received positively and/or frictionally in its first position.

When being loaded, the tensioning means holder 40 can consequently bear against the reinforcing element 58.

For example, the reinforcing element 58 is suitable for reinforcing the holding devices 12 shown in the FIGS. 1 to 3 and 5.

According to the embodiment illustrated in FIGS. 6 to 8, the holding device 12 has a fixed bearing 64 which is arranged spaced apart from the tensioning means holder 40.

The reinforcing element 58 is received to be axially movable in the fixed bearing 64. In particular, the reinforcing element 58 is held frictionally in the bearing 64 so that the reinforcing element 58 cannot slip inadvertently within the bearing 64.

For this purpose, the bearing 64 has a bore 65 in which the reinforcing element 58 is inserted.

The reinforcing element 58 can be displaced preferably manually within the bearing 64.

In order to limit displacement of the reinforcing element 58, the reinforcing element 58 includes a stop 66 disposed spaced apart from the ends of the reinforcing element.

The stop 66 is a peripheral collar, for example. Alternatively, the stop 66 may include one or more lateral projections.

In its second position, the reinforcing element 58 abuts against the bearing 64 with the stop 66.

The reinforcing element 58 is, for example, an oblong ram specifically made of plastic material or metal.

When the holding device 12 is triggered, the bearing 64 serves as a catching device for the tensioning means holder 40 as illustrated in FIG. 8.

For this purpose, the bearing 64 has a recess 70 for receiving the tensioning means holder 40 at an end face 68 facing the tensioning means holder 40. Hence, the tensioning means holder 40 is held on the holding device 12 even after the holding device 12 is triggered.

Figure 9:
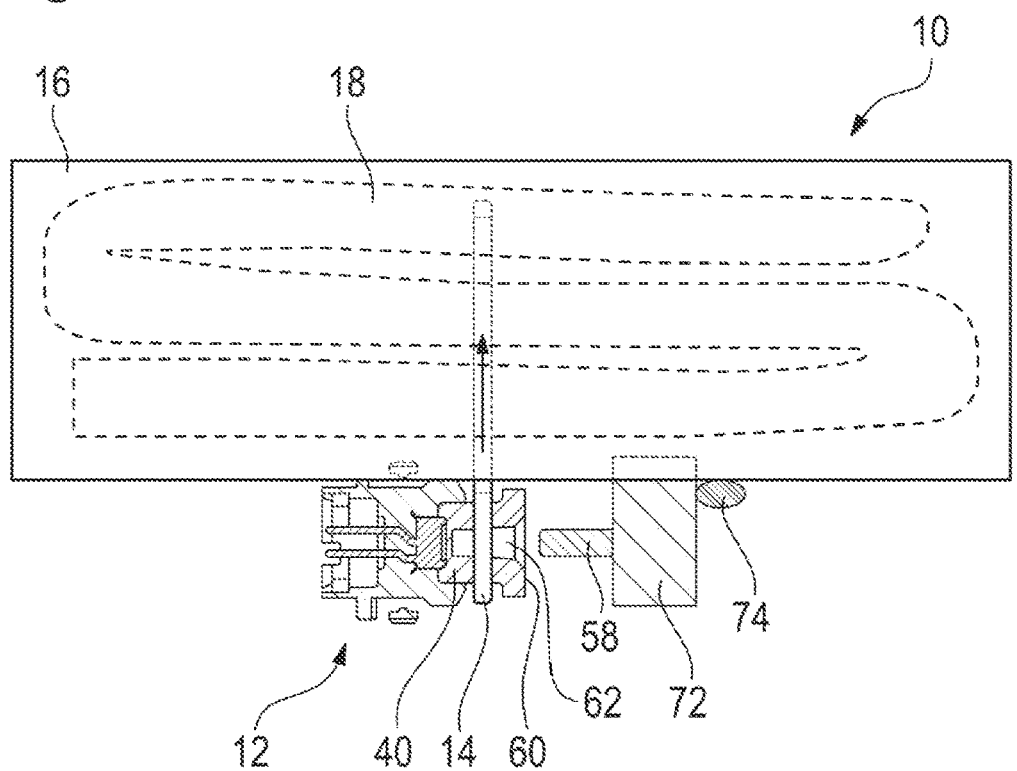
FIG. 9 shows another airbag module according to the invention comprising a holding device according to the invention.
Figure 10:
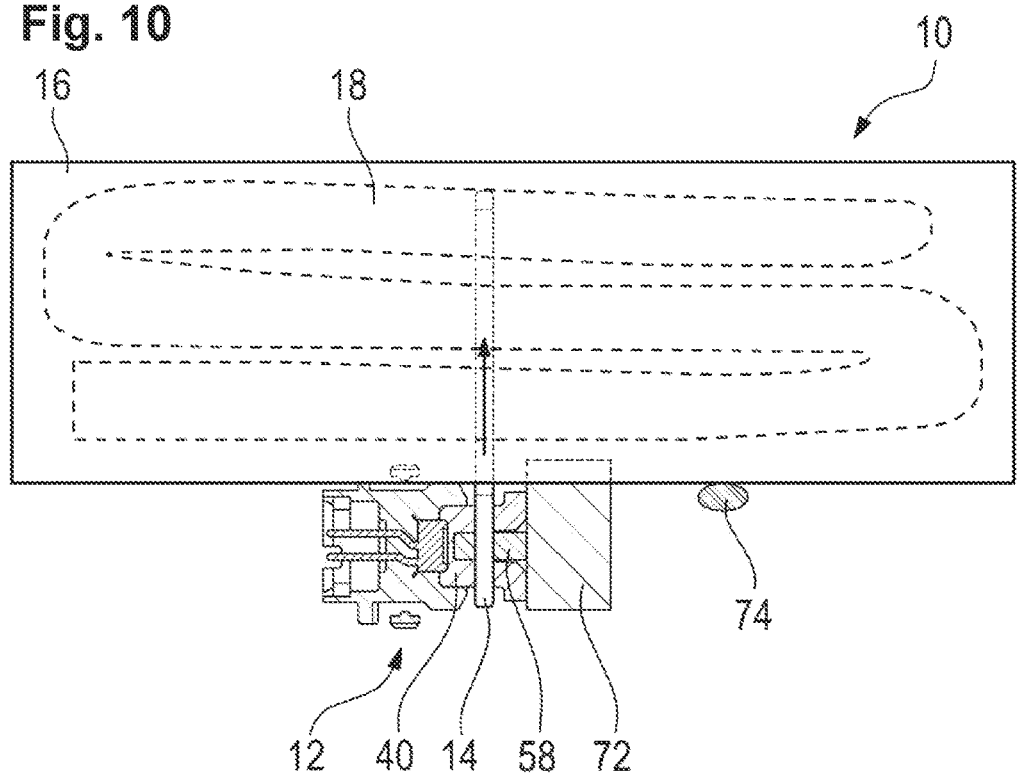
FIG. 10 shows the airbag module of FIG. 8, with the holding device being reinforced.
Figure 11:
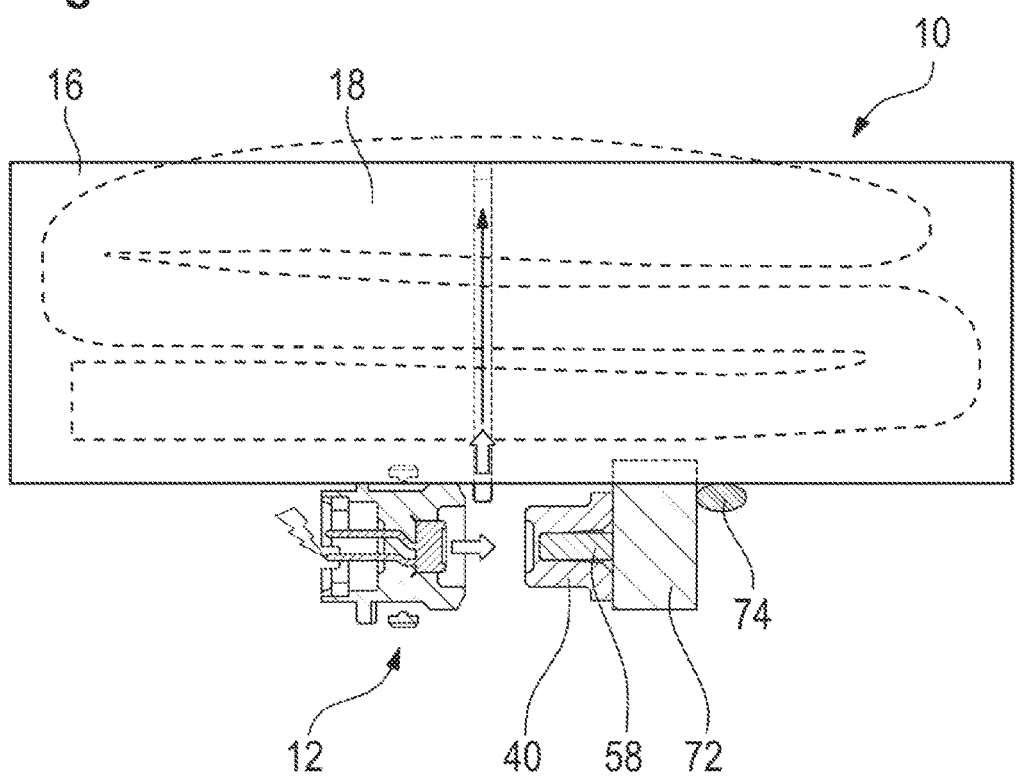
FIG. 11 shows the airbag module of FIGS. 8 and 9, with the holding device being in a triggered state.

The FIGS. 9 to 11 illustrate an airbag module 10 according to a further embodiment.

FIG. 9 illustrates the airbag module 10 comprising a holding device 12, wherein the holding device 12 is not reinforced. In FIG. 10, the holding device 12 is shown in a reinforced state. FIG. 11 illustrates the holding device 12 in a triggered state.

The airbag module 10 shown in FIGS. 9 to 11 differs from the airbag module 10 shown in FIGS. 6 to 8 by the shape of the reinforcing element 58 as well as by the bearing of the reinforcing element 58.

The reinforcing element 58 according to FIGS. 9 to 11 is tightly fixed specifically to a linearly movable bearing part 72. Thus, the bearing part 72 moves along with the reinforcing element 58 from the first to the second position.

In order to enable the bearing part 72 to be displaced, the displaceable bearing part 72 is frictionally guided in a linear guide. The bearing part 72 can be displaced preferably manually.

For example, the linear guide is formed in the airbag case 16. The linear guide may be designed as a dovetail guide, for example.

In addition, there is provided a stop element 74 that delimits displacement of the bearing part 72 in a direction away from the plastic base 26. The stop element 74 is also disposed on the airbag case 16.

The invention claimed is:

1. A holding device for holding and releasing a tensioning means of an airbag of a vehicle safety system, comprising:
    a molded plastic base;
    a pyrotechnical unit including accommodated and held in the plastic base, the pyrotechnical unit comprising a propellant charge and an igniter, the pyrotechnical unit having a rear side and an opposite front side, wherein the pyrotechnical unit is actuatable in response to the igniter receiving a signal that activates the igniter, which ignites the propellant charge; and
    a tensioning means holder comprising a fastening portion that is accommodated in the plastic base by injection-molding the plastic base around the fastening portion to connect the tensioning means holder to the plastic base, the tensioning means holder also comprising a holding portion positioned outside the plastic base, wherein the fastening portion is positioned directly adjacent to and covers the front side of the pyrotechnical unit, and wherein the holding portion is configured so that the tensioning means wraps around and engages the surface of the holding portion outside the plastic base;
    wherein the accommodation of the fastening portion in the plastic base is configured so that the tensioning means holder detaches completely as a unit without breaking from the plastic base in response to actuation of the pyrotechnical unit.

2. The holding device according to claim 1, wherein the plastic material forming the plastic base is also injection-molded around the pyrotechnical unit.

3. The holding device according to claim 1, wherein the tensioning means holder is made of a metal or a plastic material and is partially injection-molded around its outside.

4. The holding device according to claim 1, wherein the tensioning means holder includes one of a radially outward projection and a radially inwardly protruding recess when viewed in the longitudinal direction of the holding device at its portion accommodated in the plastic base.

5. The holding device according to claim 4, wherein the one of an outward projection and a radially protruding recess is peripheral.

6. The holding device according to claim 1, wherein the tensioning means holder includes a fastening portion accommodated in the plastic base as well as the holding portion adjacent thereto, wherein a contact face for the tensioning means is provided on the holding portion.

7. The holding device according to claim 6, wherein the holding portion and the fastening portion together form a cylindrical surface on the outside.

8. The holding device according to claim 7, wherein a laterally projecting collar which is widened compared to the holding portion is connected to one end of the holding portion facing away from the fastening portion.

9. The holding device according to claim 1, wherein the pyrotechnical unit excluding its electric wires is completely enclosed by the plastic base and the tensioning means holder.

10. The holding device according to claim 1, wherein the tensioning means holder includes a recess complementary to the pyrotechnical unit on its end face facing the pyrotechnical unit, in which recess a portion of an ignition head of the pyrotechnical unit is received.

11. The holding device according to claim 1, wherein the tensioning means holder includes a relief opening.

12. The holding device according to claim 11, wherein the relief opening preferably extends from the end face of the tensioning means holder facing the pyrotechnical unit to the end face of the tensioning means holder remote from the pyrotechnical unit.

13. The holding device according to claim 1, wherein the tensioning means holder is partially injection-molded in the plastic base and the plastic base is configured so that the plastic base remains free of cracks when the pyrotechnical unit is activated.

14. An airbag module for a vehicle safety system, comprising an airbag and a holding device according to claim 1, and comprising a tensioning means which is fastened to an airbag and is held on the holding device.

15. The airbag module according to claim 14, wherein a loop is formed at one end portion of the tensioning means which is not fastened to the airbag, wherein the loop is laid around the tensioning means holder in the non-triggered state of the holding device.

16. The airbag module according to claim 14, wherein a loop is formed at one end portion of the tensioning means which is not fastened to the airbag, wherein the loop is laid around the holding portion of the tensioning means holder in the non-triggered state of the holding device.

\* \* \* \* \*